3,239,531
N-AMINO-NORTROPANE DERIVATIVES
Ernst Jucker, Ettingen, Basel-Land, and Adolf J. Lindenmann, Basel, Switzerland, assignors to Sandoz Ltd., Basel, Switzerland
No Drawing. Filed July 29, 1963, Ser. No. 298,494
Claims priority, application Switzerland, July 31, 1962, 9,146/62
3 Claims. (Cl. 260—293)

The present invention relates to new N-amino-nortropane derivatives, their addition salts with acids and a process for their production.

The present invention provides compounds of the formula:

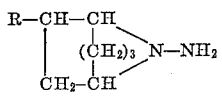   I wherein R is a member selected from the group consisting of hydrogen and methoxy, and their acid addition salts.

The present invention also provides a process for the production of compounds I and their acid addition salts, characterized in that an N-nitroso-nortropane derivative of the formula:

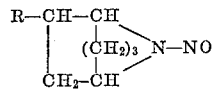   II wherein R has the above significance, is reduced by a method known to leave the N—N bond unaffected, and, when it is desired to produce an acid addition salt, salification is effected with an organic or inorganic acid; such methods of reduction are, for example, reduction with lithium aluminium hydride or zinc in glacial acetic acid or sodium amalgam.

When the process of the present invention is effected with lithium aluminium hydride, it is suitably carried out by adding a solution of compound II above in an inert organic solvent, e.g. diethyl ether, tetrahydrofuran or 1,2-dimethoxyethane, to the suspension of lithium aluminium hydride in the same solvent, while cooling, over a period of 1–8 hours. After stirring for 15 to 20 hours at room temperature and subsequently heating for approximately 1 to 2 hours under reflux, water is carefully added to the reaction mixture which has been cooled to approximately 0° to 5°, and the mixture is made alkaline with a dilute aqueous alkali metal hydroxide solution. After filtration, the resulting amine is isolated by a method known per se, e.g. by extraction with an inert solvent, preferably diethyl ether, benzene, chloroform or methylene chloride, isolated and purified by vacuum distillation, crystallization and/or by conversion into a suitable salt.

When the reduction is effected with zinc in glacial acetic acid, the reduction may be brought about, e.g., by slow dropwise addition of a solution of the nitroso compound in acetic acid at ambient temperature to a suspension of zinc dust in ethanol. In order to complete the reaction, the reaction mixture may be heated to an elevated temperature (e.g. approx. 80° C.) for a further two to three hours. After filtering and rendering alkaline at ambient temperature, the resulting N-amino-nortropane derivative is isolated, purified and salified, if desired, as described above.

When sodium amalgam is used as reducing agent, the following procedure is preferably used: The solution or suspension of the nitroso compound in water or in a lower aliphatic alcohol is added dropwise over a period of 10 to 30 minutes, while stirring, to sodium amalgam at a temperature of 20–50° C. The resulting N-amino-nortropane derivative is then isolated from the reaction mixture as described above, purified and then converted into a suitable acid addition salt if desired.

The N-amino-nortropane derivatives of the invention, which may also be termed 8-amino-8-aza-bicyclo[3,2,1]-octane derivatives, form relatively stable acid addition salts with inorganic or organic acids, e.g., hydrochloric, hydrobromic, sulphuric, citric, tartaric, succinic, maleic, malic, acetic, benzoic, hexahydrobenzoic, methanesulphonic, fumaric, gallic and hydriodic acid. The salts are crystalline at room temperature.

The N-amino-nortropane derivatives of the invention may be regarded as hydrazine compounds in view of their

group. Hydrazine derivatives of a bicyclic system, such as the nortropane nucleus, form a new class of chemical compounds which have not hitherto been described in the literature.

The products of the invention serve as intermediates for the production of pharmaceuticals, e.g. by condensing with a 3-sulphamyl-4-chloro- or -fluoro-benzoyl halide to form an N-[8'-aza-bicyclo[3,2,1]octyl-(8')]-3-sulphamyl-4-halogeno-benzoic acid amide of Formula III,

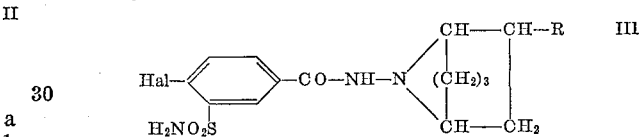   III in which R has the above significance, and Hal denotes a chlorine or fluorine atom.

These 3-sulphamyl-4-halogeno-benzoic acid amides are characterized by remarkable salidiuretic and antihypertensive effects.

The starting material of Formula II, in which R denotes the methoxy radical, is new and may be produced, for example, using the Wolff-Kishner method as modified by Huang-Minlon, by heating 6-methoxy-nortropinone with hydrazine hydrate and an alkali metal hydroxide in a suitable solvent. The acid solution of the 6-methoxy-nortropane which is obtained as an oil, is then treated with sodium nitrite solution in the cold and the N-nitroso-6-methoxy-nortropane isolated and purified by a method known per se from the reaction mixture after this has been made alkaline.

In the following examples, all temperatures are indicated in degrees centigrade. Melting and boiling points are uncorrected.

EXAMPLE 1.—N-AMINO-NORTROPANE

A solution of 8.4 g. of N-nitroso-nortropane in 90 cc. of absolute ether is added dropwise to a suspension of 4.5 g. of lithium aluminium hydride in 210 cc. of absolute ether, over a period of one hour, while cooling. The reaction mixture is then stirred for a further 15 hours at room temperature and then heated to boiling under reflux for two hours. After cooling in an ice bath, 10 cc. of water are carefully added to the reaction mixture, followed by 50 cc. of aqueous 50% potassium hydroxide solution. Filtering is then carried out through highly purified diatomaceous earth, the organic phase in the filtrate separated and the aqueous part extracted with a total of 300 cc. of ether. The united ether extracts are dried over magnesium sulphate, the ether removed by evaporation and the crystalline residue of N-amino-nortropane hydrate recrystallized from ether/petroleum ether. M.P. 54–56°. Hydrochloride: M.P. 240–242°.

EXAMPLE 2.—N-AMINO-6-METHOXY-NORTROPANE

A solution of 3.0 g. of N-nitroso-6-methoxy-nortropane in 62 cc. of ether is slowly added at 5–10° dropwise to a suspension of 1.5 g. of lithium aluminium hydride in 50 cc. of absolute ether, while cooling, over a period of 8 hours. The reaction mixture is then stirred for a further 20 hours at room temperature and then heated to boiling under reflux for 2 hours to complete the reaction. After cooling in an ice bath, 20 cc. of water are carefully added to the reaction mixture after cooling and then saturated with sodium hydroxide solution. Filtering is effected and the filtrate extracted with a total of 150 cc. of ether. The united ether extracts are dried over magnesium sulphate, the ether distilled off and the residue distilled in a vacuum, whereupon the N-amino-6-methoxy-nortropane distils over as a colourless oil at an air bath temperature of 100–110° at 12 mm. Hg.

The N-nitroso-6-methoxy-nortropane which is used as starting material is produced as follows:

(a) 6-methoxy-nortropane

A mixture of 9.3 g. of 6-methoxy-nortropinone (B.P. 102–104°/0.02 mm. Hg), 7.2 g. of sodium hydroxide, 15.0 g. hydrazine hydrate and 100 cc. of diethylene glycol is heated to 100° for one hour, while stirring. The temperature is then slowly raised to 230°, whereupon water, excess hydrazine hydrate and 6-methoxy-nortropane distil over. The distillate is then extracted with a total of 300 cc. of ether, the united ether extracts dried over magnesium sulphate and the ether removed by evaporation. The residue is fractionated, whereupon the 6-methoxy nortropane distils over as a colourless oil at between 78–81° at 12 mm. Hg.

(b) N-nitroso-6-methoxy-nortropane 7.5 cc. of concentrated sulphuric acid are slowly added to a solution of 10.0 g. of 6-methoxy-nortropane in 10 cc. of water at 10–15° while stirring and cooling. An ice-cooled solution of 25 g. of sodium nitrite in 35 cc. of water at between 0 and +3° is then added to the clear solution of the salt, over a period of 45 minutes, while continuing to stir. The reaction mixture is then extracted with a total of 250 cc. of chloroform and the united chloroform extracts washed with a total of 25 cc. of aqueous 40% sodium hydroxide solution, which has been saturated over sodium carbonate. After drying over magnesium sulphate, the chloroform is distilled off in a vacuum and the residue distilled in a vacuum, whereupon the N-nitroso-6-methoxy-nortropane distils over at between 155 and 160° at 12 mm. Hg.

What is claimed is:

1. A compound selected from the group consisting of N-amino-nortropane derivatives of the formula:

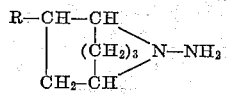

and its acid addition salts, wherein R is a member selected from the group consisting of hydrogen and methoxy.

2. N-amino-nortropane.
3. N-amino-6-methoxy-nortropane.

References Cited by the Examiner
UNITED STATES PATENTS 2,893,996   7/1959   Rudner et al. _____ 260—293 X WALTER A. MODANCE, *Primary Examiner.*
NICHOLAS S. RIZZO, *Examiner.*